Figure 1:
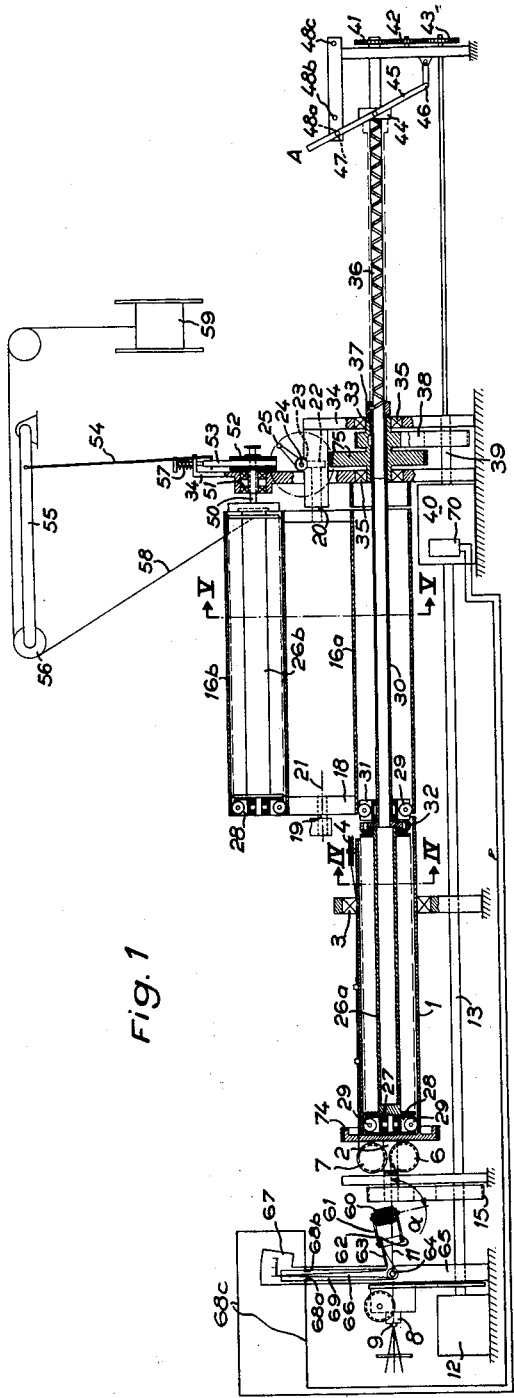

Dec. 11, 1962  O. HAUGWITZ  3,067,564
DRAG SPEED CONTROLLING DEVICE FOR A CABLE
IN A STRANDING MACHINE

Filed Jan. 31, 1961  2 Sheets-Sheet 1

Dec. 11, 1962 O. HAUGWITZ 3,067,564
DRAG SPEED CONTROLLING DEVICE FOR A CABLE
IN A STRANDING MACHINE
Filed Jan. 31, 1961 2 Sheets-Sheet 2
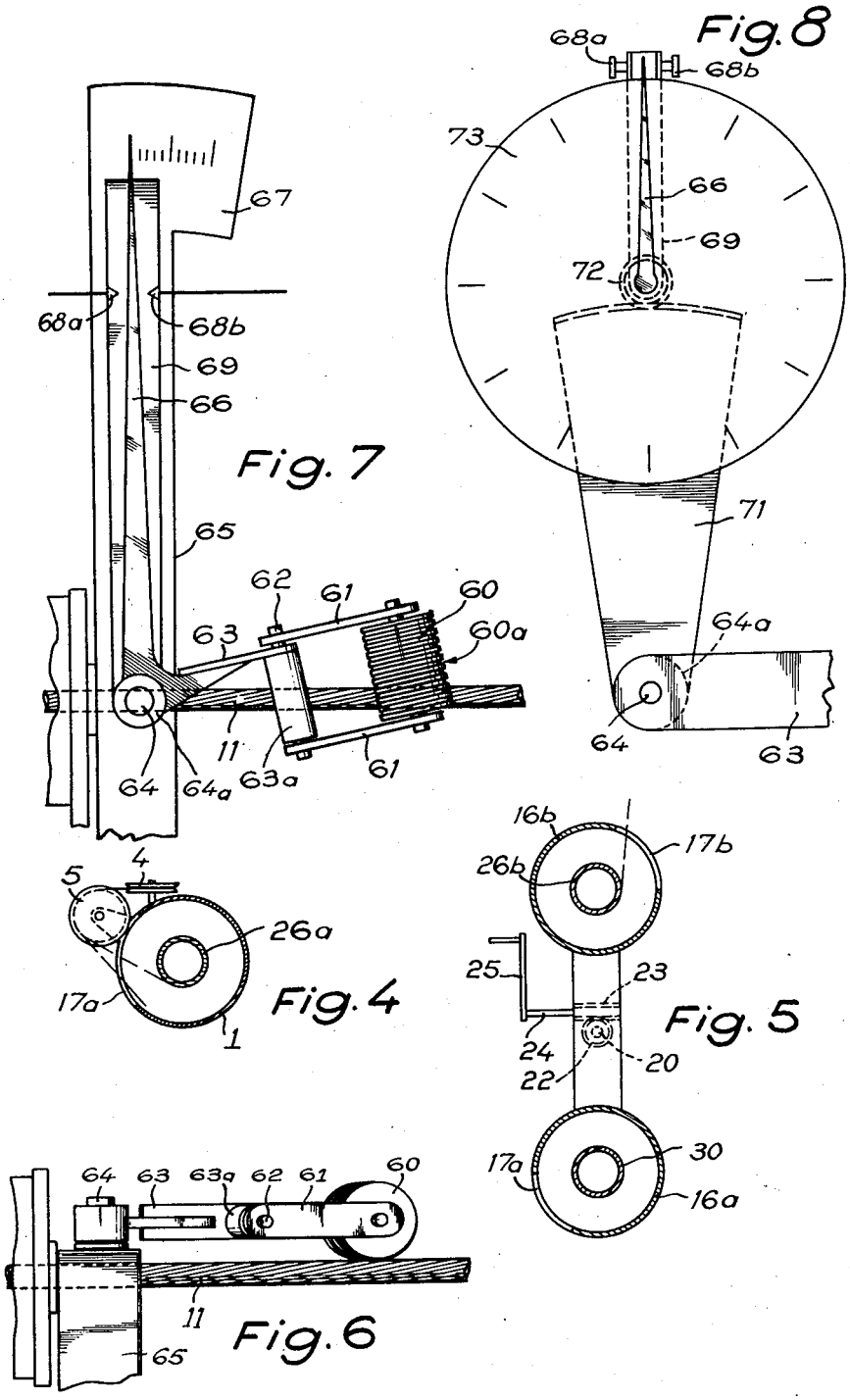

3,067,564
DRAG SPEED CONTROLLING DEVICE FOR A CABLE IN A STRANDING MACHINE

Otto Haugwitz, La Celle Saint-Cloud, France, assignor to Societe Anonyme Geoffroy-Delore, Paris, France, a French company
Filed Jan. 31, 1961, Ser. No. 86,213
Claims priority, application France Feb. 1, 1960
3 Claims. (Cl. 57—34)

In cabling machines, known as "stranding machines," the constituent threads of the cable, taken from discharge spools, are assembled in an assembly die and they proceed, guided by pulleys, into a revolving frame in order to be finally wound, in the form of a cable stranded, on to a receiving spool inside the frame, the cable forming successive layers on this spool.

This receiver spool should be driven in rotation at a speed so that the drag of the cable remains constant in spite of the variation in diameter of the successive layers.

This drag regulation is generally controlled, in a known way, by a device which is both sensitive to the rotational speed of the frame and to the linear displacement of the cable and gives corrective signals when the pitch of the cable obtained does not correspond to that required. Such a device can act, for example, upon an independent motor serving to drive the spool or on a variator interposed between the shaft of the spool and the driving means of this spool.

However, in many cases, for example for bare flexible conductors, a determined pitch in absolute value is not required but a pitch which is a certain multiple, for example 15 times, of the diameter of the finished conductor. Up to now, for each required diameter of conductor, it was necessary to calcluate a different pitch in order to obtain this result.

The present invention has for its object to provide a device which allows the speed of the receiving spool to be directly regulated according to the required relation between the diameter and the pitch, whatever the diameter may be, this relation thus being the same for all diameters.

According to the invention, said device comprises a roller in contact with the cable and carried by a support pivotally mounted about an axis perpendicular to the axis of the cable, and means sensitive to the pivoting action of the support for controlling the driving means for the receiving spools of the machine, e.g. a driving motor or a variator interposed between the shaft of the spool and the driving means of this shaft.

The support can be connected to a needle movable in front of a graduated quadrant between two adjustably positionable contacts which are connected to a controlling member of said driving means, e.g. the motor or the variator. The needle can be integral with the support; however, in order to protect it from the vibrations of the machine, it is preferable to interpose a multiplicatory transmission between the support and the needle and to make the latter of a weight such that its inertia is increased. In this case, it does not follow the rapid movements of vibration but remains in its mean position with precision.

The roller can have parallel circular grooves on its surface. These avoid all lateral sliding movements, since the roller is urged into a position for which the grooves and the spirals of the threads forming the external layer of the cable have a common tangent in their contact points.

Figure 2:
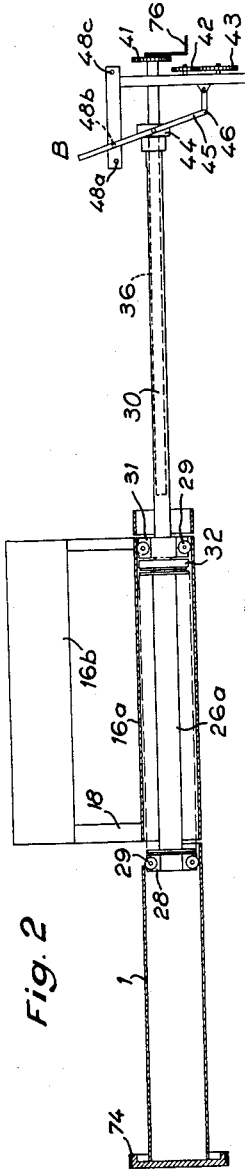
Figure 3:
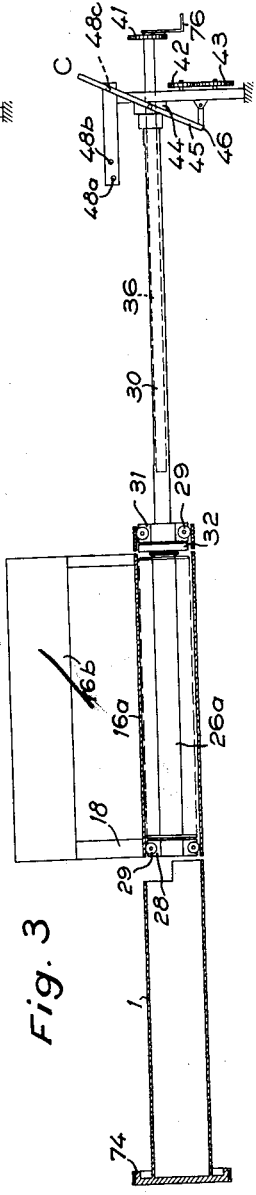

In order that the invention shall be more clearly understood, reference will now be made to the accompanying drawings which show one specific embodiment thereof, by way of example, and in which:

FIGURE 1 is an elevation of the complete machine with two interchangeable receiving spools, the part of the machine relative to the withdrawal-speed regulation device being seen in plan view, FIGURE 2 is a view of part of the machine of FIGURE 1, the full spool having been taken into its end position, furthest away from the frame, FIGURE 3 is a view similar to that of FIGURE 2, the full spool being completely removed from the frame, FIGURE 4 is a cross-sectional view along the line IV—IV of FIGURE 1, FIGURE 5 is a cross-sectional view along the line V—V of FIGURE 1, FIGURE 6 is an elevation of a withdrawal-speed regulation device, FIGURE 7 is a plan of the withdrawal-speed regulation device of FIGURE 6, and FIGURE 8 is a plan of a detail of a modification of the withdrawal regulation device.

Referring to the drawings, the stranding machine comprises a frame comprising a tubular portion 1, which is open at one end and which is integral with a hollow drive shaft 2 and supported by a roller bearing or rollers 3 at its open end. At its open end, the frame has two guide pulleys 4 and 5 (FIGURE 4) and, at its other end, two other guide pulleys 6 and 7.

In the axis of the shaft 2 is located a second hollow shaft 8 which carries an entry die 9 and a loose pulley 10. The cable members 11 to be stranded pass across the die 9, make a turn around the pulley 10, which ensures the precision of the pitch at the assembly point, pass into the hollow shaft 2 and, by means of the two pulleys 6 and 7, pass to the outside of the frame; finally, the cable is guided by the two pulleys 4 and 5 on to a receiving spool, which is located inside the frame as will be shown further on.

The stranding machine has a single drive motor 12, which drives a main shaft 13; this shaft is connected, by a belt 14, to the hollow shaft 8 and, by a belt 15, to the hollow shaft 2, the diameters of the pulleys over which the belts pass being so proportioned that the two shafts 2 and 8 revolve at the same speed.

Two tubes 16a and 16b, each provided with an axial opening 17a or 17b (FIGURE 5), and of which the diameter is substantially equal to that of the frame 1, are carried by a support 18 provided with two pivots 19 and 20, the axis 21 of which is parallel to the axis of rotation of the frame 1. The pivot 20 carries a worm wheel 22 which is in engagement with a worm 23. This worm is fixed on a shaft 24 which has a crank handle 25, this latter thus allowing the support 18 to be pivoted about the axis 21. The pivots 19 and 20 are arranged in such a way that the two tubes 16a and 16b can successively be received into the extension of the frame 1.

The stranding machine comprises two receiving spools 26a and 26b; these spools are elongated, their length being of the order of at least six to ten times their diameter. In FIGURE 1, the spool 26a is located inside the frame 1 while the spool 26b is in the tube 16b.

The end of the spool 26a located on the closed end of the frame 1 is mounted by means of a roller bearing 27 in a support 28 which bears on the internal walls of the tube of the frame by rollers 29. The axis of the rollers are perpendicular to the axis of the frame 1 so that these rollers 29 turn with the frame but allow the axial displacement of the support 28, and, therefore, of the spool 26a.

In the position of FIGURE 1, a hollow shaft 30 is disposed inside the tube 16a. Its end located beside the frame is carried by a support 31 similar to the support 28 and is provided, like the latter, with rollers 29.

This shaft is connected ot the spool 26a by a coupling 32.

The hollow shaft 30 is keyed to slide in a hollow shaft 33 which is located opposite the frame 1 and supported by the structure 34 of the machine by means of roller bearings 35. Within the hollow shaft 30 is connected a cross-threaded bolt 36 which co-operates with a pin 37 carried by the hollow shaft 30.

The hollow shaft 33 is driven by a belt 38 acting from the output shaft 39 of a variator 40 driven by the main shaft 13. The bolt 36 is also connected to this shaft 39 by a train of exchangeable gears 41, 42 and 43. The bolt 36 carries a ball-stop 44 mounted on a lever 45 articulated at 46 on the structure of the machine. This lever carries a pin 47 which can be engaged in one of a plurality of holes 48a, 48b and 48c provided in a bar 49 integral with the structure. In FIGURE 1, the pin 47 is engaged in the hole 48a in such a way that the bolt 36 cannot be axially displaced. The result is that any relevant rotation of the shaft 30 and of this bolt 36 induces an axial displacement of this shaft 30 and, therefore, of the spool 26a which is coupled thereto. Thus, it may be seen that the relation of the train formed by the gears 41, 42 and 43 which determines its relative speed, determines the stranding pitch.

The end of the spool 26b located beside the frame 1 is mounted in a support 28 in a similar way to the corresponding end of the spool 26a. The other end of the spool 26b in the position of FIGURE 1 is coupled to a shaft 50 which is supported by the structure 34 by means of roller bearings 51. This shaft 50 carries a brake-drum 52. Over this drum 52 passes a braking belt 53 one end of which is connected by means of a rod 54 to an articulated rocker 55 carrying a pulley 56; an adjustable spring 57 tends to apply the belt 53 on to the drum 52 and consequently tends to brake the latter. The stranded cable 58 passes over the pulley 56 which guides it towards an external receiving spool 59. The rocker 55, tending to displace the rod 54, against the action of the spring 57, regulates the action of the brake. The assembly forms means for unwinding the cable which is located on the spool 26b.

On that part of the members of the cable 11 which are located between the die 9 and the hollow shaft 2 rests a roller 60, the surface of which can be smooth or, preferentially, can be provided with parallel circular grooves 60a. This roller 60 is carried by arms 61 which are mounted to be pivotable about a horizontal shaft 62 of a cylinder 63a carried by an arm 63 (FIGURES 1, 6 and 7). This arm 63 is itself fixed on a bushing 64a pivotally mounted about a vertical stud 64 on a support 65 integral with the structure of the machine. The arm 63 is integral with a needle 66 movable in front of a quadrant 67 having a graduation indicating the quotient $k$ of the stranding pitch $p$ of the cable divided by the diameter $d$ of this cable. The needle 66 is disposed between two contacts 68a and 68b which are carried by adjustable lever 69 pivotally mounted around the stud 64; these contacts 68a and 68b are connected by electrical conductors 68c to a servo-motor 70 controlling the variator 40. This variator 40 can, for example, be of the extensible pulley type, the displacement of the movable pulley or pulleys being ensured by a motor rotating in one direction or in the other following which contact 68a or 68b is contacted by the needle 66.

In the modification shown in FIGURE 8 the angular displacement of the needle 66 is multiplied. To this end, a toothed sector 71, of radius $R_1$, is integral with the bushing 64a which is integral with the arm 63. This toothed sector 71 is in engagement wtih a pinion 72 of radius $R_2$ the axis of which carries the needle 66. The adjusting lever 69 carrying the contacts 68a and 68b is pivotally mounted about the axis of the pinion 72. The graduated quadrant 73 in front of which the needle 66 is movable is in this case circular. So, when the arm 63 with the bushing 64a rotates through an angle of value $\omega$, the needle 66 is rotated, by means of the sector 71 and of the pinion 72, with an angle B the value of which is equal to $$\frac{R_1}{R_2} \cdot \omega$$

Furthermore, to avoid influence of the vibrations of the machine onto the needle, it is advantageous to make the latter of a weight such as its inertia is increased.

Finally, the frame 1 and the hollow shaft 33 carry brake-drums 74 and 75 which permit a quick stopping of the machine in spite of the inertia of these members which, during their operation, rotate at high speed.

The machine which has just been described operates in the following way:

In FIGURE 1, the spool 26a is located completely within the frame 1 while the spool 26b is in the discharge position; the cable which this spool 26b carries is ready to be removed in order to be wound on to the external receiver spool 59. The lever 45 is in position A in which the spool 26a is connected to the shaft 39.

After the machine has been set in operation, the stranded thread is wound by the frame 1 on to the spool 26a which rotates in the same direction as the frame but at a different speed from that of the frame, this speed being controlled by the variator 40, as will be shown further on. At the same time, the bolt 36, which is driven at a different speed from that of the spool 26a but in a fixed relation with regard to this latter speed, imparts a to-and-for axial movement to the spool 26a in such a way that the stranded cable is wound on to the spool while forming on the latter several successive layers.

When the spool 26a is full, the machine is stopped and the lever 45 is taken into position B (FIGURE 2), and the effect of this is to throw the pinions 41 and 42 out of engagement. A crank handle 76 is then placed on the end of the bolt 36 and this crank handle is turned until the spool 26a, which was stopped in any position, is located in the righthand end position in FIGURE 2. The lever 45 is then taken into the position C (FIGURE 3), and this results in the complete removal of the spool 26a from the frame 1, the shaft 30 being completely removed from the tube 16a. This shaft 30 is then uncoupled from the spool 26a.

With the help of the crank handle 25, the support 18 is caused to pivot in such a way as to bring the tube 16b containing the spool 26b which is now empty to the position of the tube 16a. This spool 26b is then coupled to the shaft 30 and this spool is put into the operative position by taking the lever 45 into the position A.

When the cabling of the following length is begun and while the manufactured cable is wound on to the spool 26b, the spool 26a is coupled to the shaft 50 and the cable is unwound from this spool on to the external spool 59; during this operation, the rotation of the spool 26a is braked by the drum 52, the braking force being automatically regulated by the rocker 55.

During the winding of the cable on to the spool 26a (or on to the spool 26b), the roller 60 is automatically orientated so that its axis forms an angle $\alpha$ with the cable. This angle depends solely upon the quotient $k$ of the stranding pitch $p$ of the cable divided by the diameter of the finished conductor, this quotient being equal to tan $\alpha$.

The quadrant 67 (FIGURE 1) or quadrant 73 (FIGURE 8), is graduated in function of this quotient, that is to say of tan $\alpha$. At the beginning of the operation of the machine, the lever 69 is placed in front of the graduation corresponding to the required quotient $k$.

When the cable is wound on to the spool 26a (or the spool 26b), the drag of the cable members 11 tends to increase by reason of the increase in the diameter of the receiving spool. As a result of this drag increase the angle $\alpha$ tends to increase and this causes the arm 63 of the needle 66 to pivot. This needle tends to touch the contact 68b and this entails the modification of the relation of the transmission of the variator 40, in the direction corresponding to an increase of the rotational speed of the spool, until the drag on the cable once more has the required value and, as a result, the roller 60 regains its original position. The reverse happens if the drag on the cable decreases. It may thus be seen that the drag on the cable can be held constant.

It will be apparent that the invention is not limited to the specific embodiment described and shown and that various modifications may be made thereto. For example, the shaft 39 could be driven by means of an independent motor, the speed of which would be electronically controlled as a function of the position of the roller 60.

What I claim is:

1. A drag speed controlling device for a cable in a stranding machine, comprising a roller having a peripheral surface in contact with the cable, a support having an end supporting the roller, means mounting the other end of the support for pivotal movement about an axis perpendicular to and intersecting the cable axis, a conducting needle connected to the arm for movement therewith, a pair of contacts positioned to contact the needle at spaced points on either side thereof, and circuit means connecting the needle and contacts in a drive speed control circuit of the machine.

2. A device as claimed in claim 1, comprising a multiplicatory transmission connecting the said support and the needle, said needle being relatively heavy.

3. A device as claimed in claim 2, in which the roller has circular parallel grooves at its circumference.

References Cited in the file of this patent

UNITED STATES PATENTS

| | | |
|---|---|---|
| 2,209,584 | Somerville | July 30, 1940 |
| 2,714,282 | Rozieres | Aug. 2, 1955 |